(12) United States Patent
Brewer et al.

(10) Patent No.: US 7,009,915 B2
(45) Date of Patent: Mar. 7, 2006

(54) COMPACT COLOR CHANGING LCD WATCH

(75) Inventors: Donald R. Brewer, Richardson, TX (US); Terrence Chan, Wong Chuk Hang (HK); Ronald Nalumen, Wong Chuk Hang (HK); Danny So, Wong Chuk Hang (HK); Vernon Yau, Wong Chuk Hang (HK)

(73) Assignee: Fossil, Inc., Richardson, TX (US)

( * ) Notice: Subject to any disclaimer, the term of this patent is extended or adjusted under 35 U.S.C. 154(b) by 280 days.

(21) Appl. No.: 10/355,402

(22) Filed: Jan. 31, 2003

(65) Prior Publication Data

US 2003/0165086 A1     Sep. 4, 2003

Related U.S. Application Data

(63) Continuation-in-part of application No. 10/087,245, filed on Mar. 1, 2002.

(51) Int. Cl.
*G04B 25/00*    (2006.01)
*G04B 19/04*    (2006.01)
*G04C 19/00*    (2006.01)
*G04C 23/02*    (2006.01)

(52) U.S. Cl. .............................. 368/71; 368/80; 368/82; 368/84; 368/88

(58) Field of Classification Search .................. 368/71, 368/80, 82, 84, 88, 223, 239, 241, 300, 203–204, 368/281

See application file for complete search history.

(56) References Cited

U.S. PATENT DOCUMENTS 3,911,665 A    10/1975   van Berkum (Continued)

FOREIGN PATENT DOCUMENTS

JP         50-102289         8/1975

(Continued)

*Primary Examiner*—Vit W. Miska
(74) *Attorney, Agent, or Firm*—David W. Carstens; Carstens & Cahoon, LLP

(57) ABSTRACT

The present invention includes a dual display watch module comprising a watch face with selectively changing backgrounds which is capable of displaying the time of day using an analog display superimposed over the color-changing watch face thereby creating unique optical effects and patterns and which has a significantly reduced overall thickness. The invention includes a novel configuration of the internal components of the timepiece resulting in a significant reduction in the thickness of the subject timepiece, thereby enhancing the comfort of the individual wearing the timepiece. The novel configuration comprises positioning two smaller sized batteries in the same spatial plane as the PCB and analog watch movement instead of the conventional stacked assembly arrangement whereby a larger battery is placed directly behind the PCB. This allows for an overall thinner movement, thereby resulting in a significantly thinner watch without detracting from the functionality of the watch. The novel configuration of the present invention is achieved by utilizing a single micro-control unit (MCU) to drive both a core analog movement and a color-changing LCD display. Utilizing two 1.5V batteries, the present invention continuously powers the analog movement at 1.5V and steps up the voltage to 3V to intermittently power the color-changing LCD display.

26 Claims, 5 Drawing Sheets

U.S. PATENT DOCUMENTS

| | | | | |
|---|---|---|---|---|
| 4,296,488 A | * | 10/1981 | Nakayama | 368/80 |
| 4,435,046 A | * | 3/1984 | Nishimura | 349/142 |
| 4,436,435 A | | 3/1984 | Ushikoshi | |
| 4,555,184 A | * | 11/1985 | Fujimori | 368/88 |
| 5,062,090 A | * | 10/1991 | Komiyama | 368/88 |
| 5,369,627 A | * | 11/1994 | Ikegami | 368/88 |
| 5,446,703 A | * | 8/1995 | Schwartz | 368/80 |
| 5,566,136 A | * | 10/1996 | Schwartz et al. | 368/35 |
| 5,995,456 A | * | 11/1999 | Brewer et al. | 368/84 |
| 6,084,828 A | | 7/2000 | Bland et al. | |
| 6,272,075 B1 | | 8/2001 | Paganelli et al. | |

FOREIGN PATENT DOCUMENTS

| | | |
|---|---|---|
| JP | 52-48369 | 4/1977 |
| JP | 6-230371 | 8/1994 |
| JP | 11-194359 | 7/1999 |
| JP | 11-242087 | 9/1999 |
| JP | 11-316558 | 11/1999 |
| JP | 2000-111940 | 4/2000 |
| JP | 2000-298273 | 10/2000 |
| JP | 2000-304884 | 11/2000 |
| JP | 2000-310774 | 11/2000 |
| JP | 2001-296546 | 10/2001 |

* cited by examiner

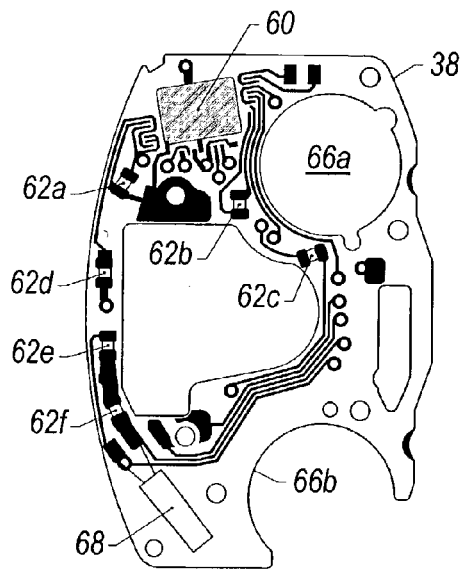 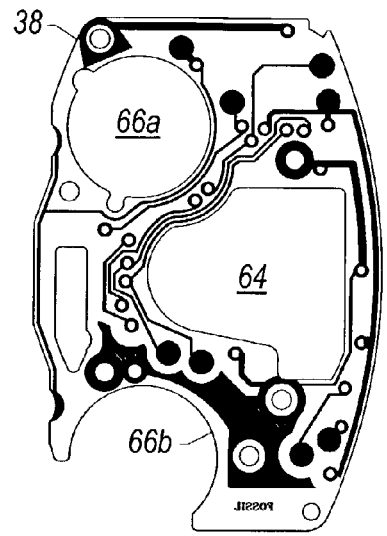
Fig. 3a          Fig. 3b
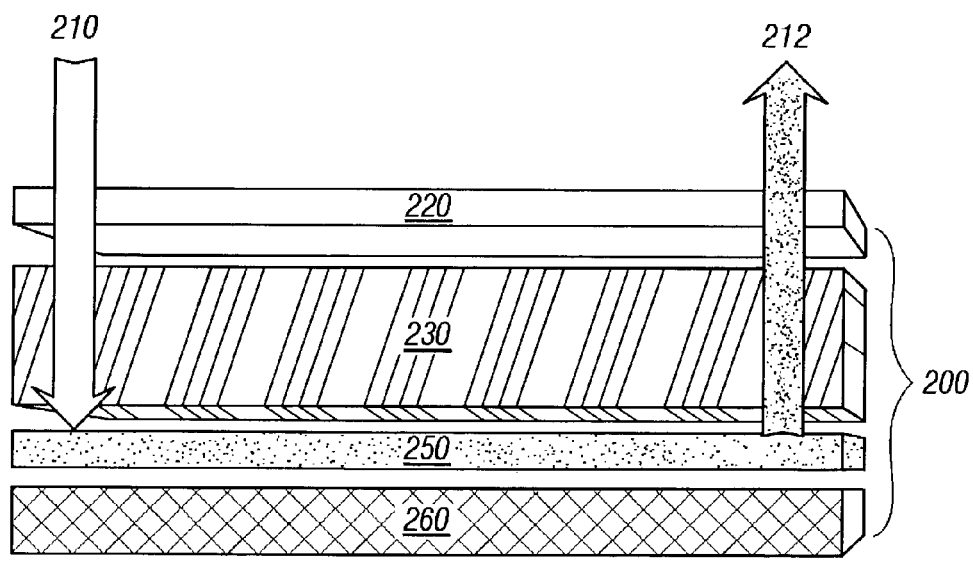
Fig. 4a

COMPACT COLOR CHANGING LCD WATCH

CROSS-REFERENCE TO RELATED APPLICATION

The present application is a continuation in part and also claims benefit of and incorporates by reference co-pending patent application Ser. No. 10/087,245 filed on Mar. 1, 2002, and entitled "Improved Timepiece."

BACKGROUND OF THE INVENTION

1. Technical Field

The present invention generally relates to an improved timepiece module, also called a watch, or other horologic device having a display. More specifically, the present invention relates to an improved electronic timekeeping apparatus which features improved ergonomic and design functionality, namely, a novel arrangement of timepiece components resulting in a significant reduction the thickness.

2. Description of the Related Art

A wide variety of electronic timepieces utilizing liquid crystal display (LCD) elements have been developed with great commercial success. Some of these electronic timepieces feature LCD elements which indicate the time in the form of numerals or in what is often referred to as a digital time display. The related art has also fashioned LCD elements for electronic watches that represent time in a conventional analog-type format.

More recently, electronic watches have increasingly begun to feature both conventional electro-mechanical analog time displays and complimentary LCD displays as consumers and manufacturers realize that both types of displays have certain advantages. Early examples of the dual display concept wristwatches were typically large and bulky and included only small LCD elements. For example, U.S. Pat. No. 3,911,665 to van Burkum discloses a wristwatch comprised of complimentary mechanically-driven analog and electrically-driven digital displays. U.S. Pat. No. 4,436,435 to Ushikoshi further advanced the art by disclosing an electronic wristwatch featuring a conventional analog display and a complimentary digital LCD display which indicates hours and minutes in alphanumeric format and included an optional alarm indicator and a flashing colon between the hours and minutes to passing seconds. The digital display of the Ushikoshi '435 wristwatch is located above (or in approximately the same plane) as the analog watch dial, thus allowing for a thinner overall design. Both displays of the Ushikoshi '435 wristwatch are driven by a single battery and a single time standard and timing circuit.

A more recent example of a dual display concept wristwatch is found in U.S. Pat. No. 6,084,828 to Bland et al., which features a timepiece and chronometer with a superimposed analog/digital display arrangement. The digital LCD display serves as the watch dial and indicates passing seconds by incrementally displaying either digits 00 through 59 or digits 01 through 60 for one second each, either in dark numerals over a light background, or vice versa. The analog display is driven by an electrical watch movement located beneath the LCD display and comprises a battery, a timing standard, timing circuitry, a stem and crown assembly, and a hand moving assembly that extends upward through the center aperture of the LCD display and couples to the analog watch hands. The digital display driver, also located behind the LCD display, couples to the digital LCD display and comprises a second battery, a timing standard, and timing and display driving electronic components and circuitry. However, while the analog movement and the digital display driver may share the same electrical ground, they are otherwise electrically isolated from one another.

Even more recently, dual display watches featuring a color-changing watch face or dial, marketed as KALEIDO™ by Fossil®, have become a significant consumer success. The watches feature a color-changing LCD display with a centralized hole through which an hand-moving assembly of an analog watch movement protrude and are affixed with conventionally styled hour and minute hands. The color-changing LCD display serves as a watch face and may have indices affixed to it. The color-changing LCD display features at least one pixel that changes color either automatically, or is selectively controlled by the user. The effect is a watch that appears like a conventional analog watch with the added feature that the user can have a watch face that changes colors or is animated in some fashion. Despite its commercial success, limitations in its current design impede its broader application. The foremost detractor to the broader application of the current design of the KALEIDO™ watch is its size.

Currently, the inclusion of an color-changing LCD display into a conventional electronic timepiece results in a noticeably thicker watch. For example, as shown in FIG. 1, prior art dual display watches 10 typically include a conventional stacked assembly of internal watch components arranged within a watch case 4 having a transparent protective watch crystal 2. As illustrated, the conventional stacked assembly arrangement usually comprises an color-changing LCD display 12, an analog watch movement 14, one or more printed circuit board (PCB) assemblies 16, and a battery 18. In this arrangement, the thickness of the resulting timepiece is dictated by the sum of the thicknesses of the stacked components. This is particularly problematic when an analog watch movement 14 is incorporated into the display by drilling a hole through the color-changing LCD display 12 to accommodate the analog watch hand movement 14a. The problem is further compounded when the LCD element 12 comprises more than one LCD element and/or includes added colorization and polarization layers. As a consequence, the resulting thickness and general size of current dual display watches often detracts from the aesthetics and physical ergonomics of the watches, making them undesirable to many customers. While many men may actually prefer a large watch, such watches are oftentimes ungainly for women. The conventional stacked assembly arrangement of current dual display watches makes it nearly impossible to make a watch of suitable thickness for a woman, namely, less than 11–12 mm. In fact, most women's watches feature thicknesses less than 9.5 mm.

Thus, improved ergonomics are essential to enhancing the interaction of humans with technologically advanced electronic devices, such as electronic timepieces. While the ability to accurately and rapidly convey discrete information is important to the design of any timepiece, the consumer market also demands that such increased complexity and functionality not detract from the comfort, ease of use, or fashion elements. Thus, it is equally important that a watch be as comfortable to wear as it is functional to use, and still remain fashionable. Moreover, in the women's fashion watch market, success is based upon giving the customer appropriately sized, low-priced watches that allow them to match different watches to different outfits. The sales potential in this market for an appropriately sized, comfortable and functional watch that can display changing colored segments or simply a watch face that can change based on preprogrammed electronics or at the whim of the customer is thought to be very strong.

SUMMARY OF THE INVENTION

The present invention addresses many of the shortcomings of the prior art dual display watch technology. The present invention includes a watch comprising a watch face with selectively changing backgrounds which is capable of displaying two or more colors thereby creating unique optical effects and patterns and which has a significantly reduced overall thickness.

The invention includes a novel configuration of the internal components of the timepiece resulting in a significant reduction in the thickness of the subject timepiece, thereby enhancing the comfort of the individual wearing the timepiece. The novel configuration comprises positioning two smaller sized batteries in the same spatial plane as the PCB and analog watch movement instead of the conventional stacked assembly arrangement whereby a larger battery is placed directly behind the PCB. This allows for an overall thinner movement, thereby resulting in a significantly thinner watch without detracting from the functionality of the watch.

The novel configuration of the present invention is achieved by utilizing a single micro-control unit (MCU) to drive both a core analog movement and a color-changing LCD display. Utilizing two 1.5V batteries, the present invention continuously powers the analog movement at 1.5V and steps up the voltage to 3V to intermittently power the color-changing LCD display.

The invention is particularly suited for use with time pieces having watch faces with selectively change backgrounds as set forth in previously referenced co-pending U.S. patent application Ser. No. 10/087,245 filed on Mar. 1, 2002, and entitled "Improved Timepiece." The entirety of said co-pending patent application is incorporated herein by this reference.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIGS. 3a and 3b show the front and rear sides of the printed circuit board (PCB) of the present invention according to one embodiment;

FIG. 4a is a vertical sectional view illustrating the layers of an LCD arrangement in accordance with an embodiment of the present invention wherein the LCD element is in an "OFF" state;

Figure 1:
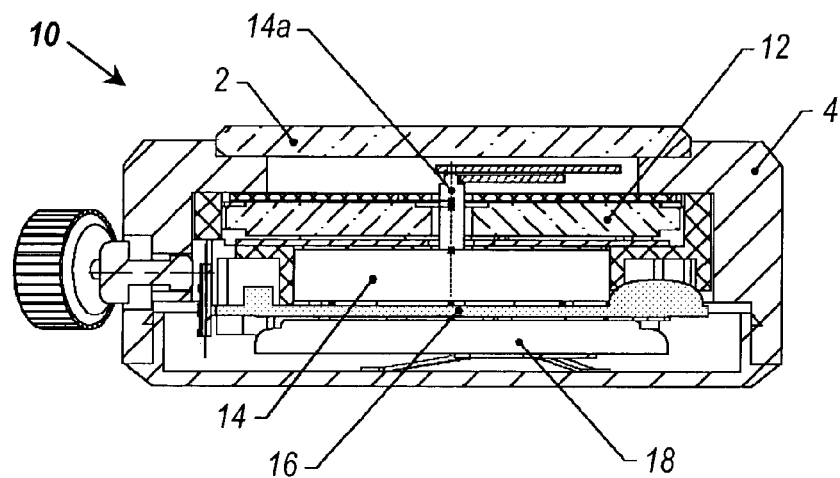
FIG. 1 is a cross-sectional view of a prior art dual display watch illustrating the conventional stacked assembly of internal watch components.

Where used in the various figures of the drawing, the same numerals designate the same or similar parts. Furthermore, when the terms "top," "bottom," "first," "second," "upper," "lower," "height," "width," "length," "end," "side," "horizontal," "vertical," similar terms are used herein, it should be understood that these terms have reference only to the structure shown in the drawing and are utilized only to facilitate describing the invention.

DETAILED DESCRIPTION OF THE INVENTION

The present invention comprises a dual-display electronic timepiece which includes a watch face with selectively changing backgrounds that incorporates a novel configuration of the internal components resulting in a significant reduction in the thickness of the subject timepiece, thereby enhancing the ergonomic comfort of the individual wearing the timepiece. The novel configuration comprises positioning two smaller sized batteries in the same spatial plane as the PCB and analog watch movement instead of the conventional stacked assembly arrangement whereby a larger battery is placed directly behind the PCB. This allows for an overall thinner movement, thereby resulting in a significantly thinner watch without detracting from the functionality of the watch. The novel configuration of the present invention is achieved by utilizing a single micro-control unit (MCU) to drive both a core analog movement and a color-changing LCD display. The present invention is particularly suited for use with time pieces having watch faces with selectively change backgrounds as set forth in previously referenced co-pending U.S. patent application Ser. No. 10/087,245 filed on Mar. 1, 2002, and entitled "Improved Timepiece." The entirety of said co-pending patent application is incorporated herein by this reference.

This disclosure describes numerous specific details that include specific structures and circuits in order to provide a thorough understanding of the present invention. One skilled in the art will appreciate that one may practice the present invention without these specific details. In addition, while this disclosure focuses on the application of the present invention to wristwatches, one skilled in the art will recognize that the present invention can be also be applied in the context of any horological instrument.

Figure 2A:
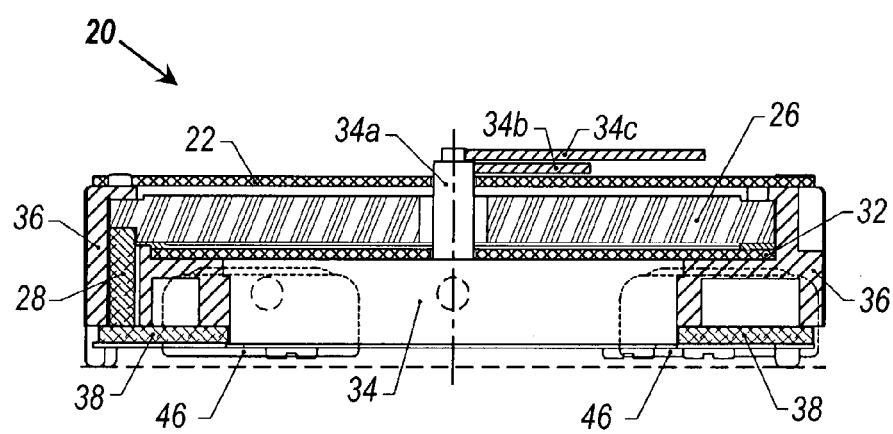
FIG. 2a is a cross-sectional view of one embodiment of the present invention showing the arrangement of the various component parts.
Figure 2B:
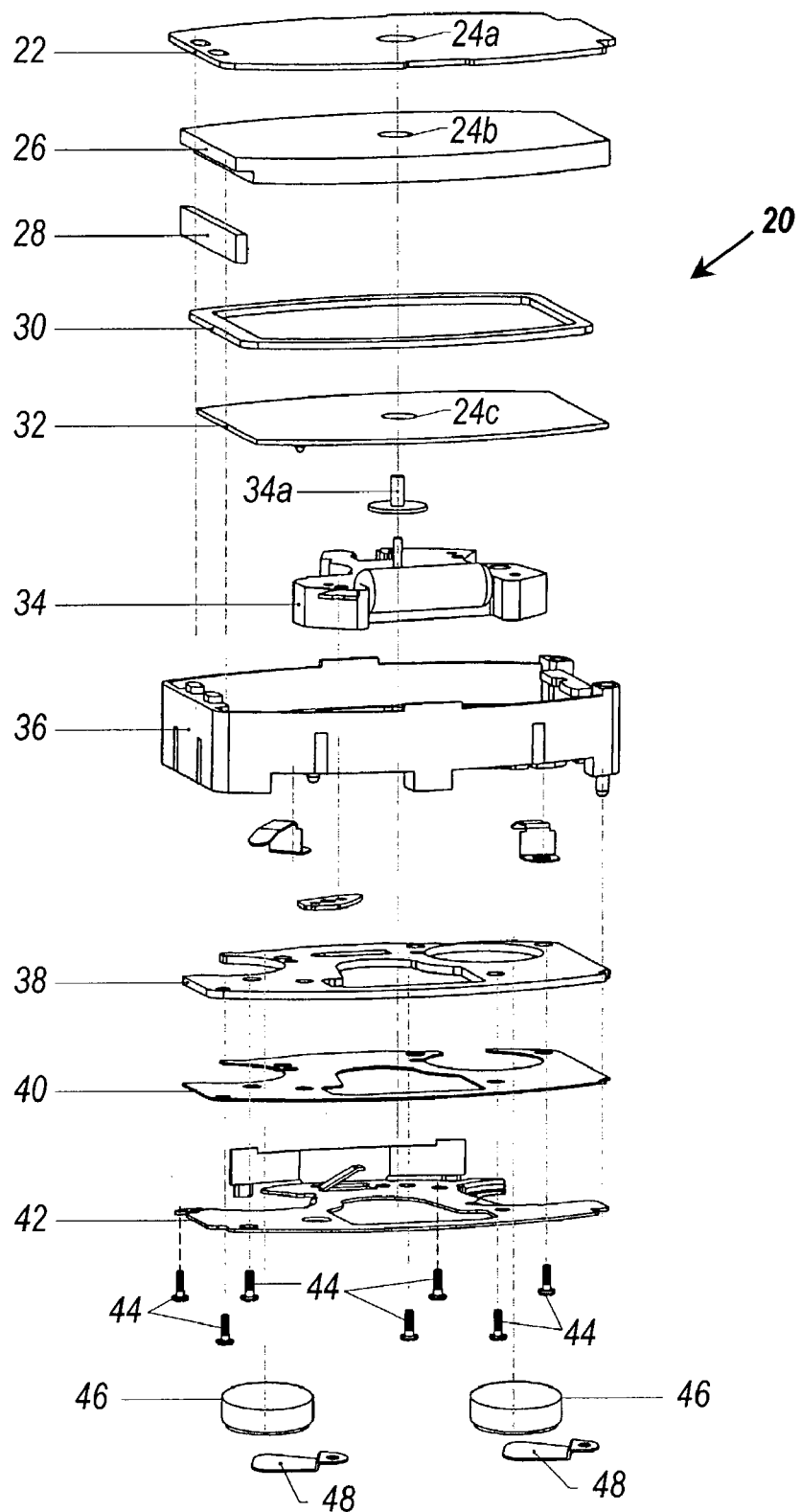
FIG. 2b is a perspective in exploded view of one embodiment of the present invention showing the arrangement of various component parts.

FIGS. 2a and 2b show one embodiment of the present invention suitable for a wristwatch application. The invention comprises a watch module 20 which includes a housing 36 enclosing a color-changing LCD display comprised of an LCD element 26 positioned between a transparent upper dial 22 and an opaque inner dial 32, an analog watch movement 34, a printed circuit board (PCB) assembly 38, and two batteries 46. In a preferred embodiment, two 1.5V silver oxide batteries are utilized. The PCB assembly 38 is electrically coupled to LCD element 26 via zebra connector 28. As illustrated in FIG. 2a, the analog watch movement 34, printed circuit board (PCB) assembly 38, and two batteries 46 are generally positioned in the same spatial plane.

The analog watch movement 34 comprises a self contained step motor assembly and further includes a hand movement assembly 34a that extends through apertures 24c, 24b, 24a in the center of inner dial 32, LCD element 26 and upper dial 22, respectively, and couples to an hour hand 34b and a minute hand 34c which rotate about the hand movement assembly 34a in the conventional manner. The analog watch movement 34 may also include a conventional stem and crown assembly 58a (not shown in FIGS. 2a and 2b) for manually positioning analog hands 34b, 34c in the conventional manner.

Figure 2C:
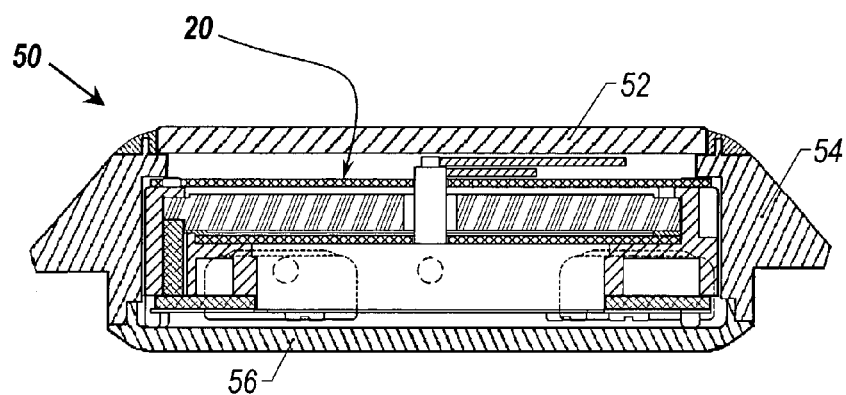
FIG. 2c is a cross-sectional view of one embodiment of the present invention in a wristwatch application, showing the watch module within a watch case.

Referring now to FIG. 2c, a cross-sectional view is shown of an embodiment of the watch module 20 of the present invention mounted in a wristwatch 50. As known in the conventional art, the wristwatch 50 may comprise a metallic or plastic watch case 54 and case back 56 and a protective transparent watch crystal 53. Those skilled in the art will also recognize that the watch case 54 may also include an interior bezel with markings that facilitate the analog display by the position of the hour hand 34b and the minute hand 34c.

Figure 2D:
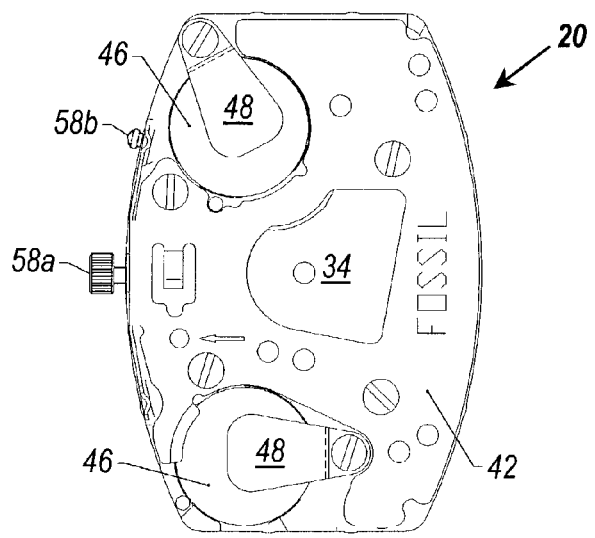
FIG. 2d is rear view of one embodiment of the present invention, showing the arrangement of the analog movement and batteries.

FIG. 2d is a plan view of an embodiment of the watch module 20 of the present invention from the rear, which shows the relative positions of analog movement 34 with the two 1.5V batteries 46 and their respective battery supports 48 which hold them in position. The analog watch movement 34 is a quartz crystal or other self-contained, battery-powered electronic analog watch movement well known in the art, such as a Ronda 751.5/753.5 or other readily available watch movements, and is thus not described in further detail here.

FIGS. 3a and 3b show the front and rear sides of the PCB assembly 38, which contains a novel configuration whereby a single micro-control unit (MCU) is utilized to drive both the core analog movement 34 and the LCD element 26. Whereas prior art dual display watches typically utilized separate systems to drive the analog movement and LCD display, the present invention utilizes an integrated system configuration whereby both the analog watch movement 34 and the LCD element 26 are powered and controlled through the same MCU. Utilizing the two 1.5V batteries 46, the present invention continuously powers the analog watch movement 34 at 1.5V and intermittently steps up the voltage to 3V to power the LCD element 26.

The PCB assembly 38 includes the timing standard and electronic circuitry necessary to drive the LCD element 26. In the embodiment described in this disclosure, PCB assembly 38 comprises a double-sided printed circuit board with the following surface-mounted CMOS electronic components: a COB integrated circuit MCU 60, electronic timing standard 68, and chip capacitors 62a–f, all shown in FIG. 3a. The timing circuitry using an electronic timing standard such as a quartz crystal oscillator is well known in the prior art and thus no further detail regarding the specifics of such is necessary or provided in this disclosure. In a preferred embodiment, the COB integrated circuit MCU 60 comprises an MTU410-269.

Referring once again to FIGS. 2a, 3a, and 3b, it will be noted that the PCB assembly 38 also includes multiple apertures 66a–b, and 64 whereby the assembly 38, analog watch movement 34, and two batteries 46 are positioned in the same spatial plane within the housing 36. This configuration results in a significantly thinner watch without detracting from the functionality of the watch.

While in its simplest embodiment, the upper dial 22 of the present invention simply comprises a transparent plastic protective layer, it is understood that upper dial 22 may also comprise a polarizer layer or colored polarizer layer in accordance with the disclosure of co-pending U.S. patent application Ser. No. 10/087,245. Moreover, it is further understood that the LCD display comprised of the LCD element 26 positioned between the upper dial 22 and the inner dial 32 may also two LCDs set in a tandem arrangement and additional polarizer, colored polarizer and reflective polarizer layers in accordance with the various arrangements of color-changing LCD displays disclosed in co-pending U.S. patent application Ser. No. 10/087,245.

Figure 4B:
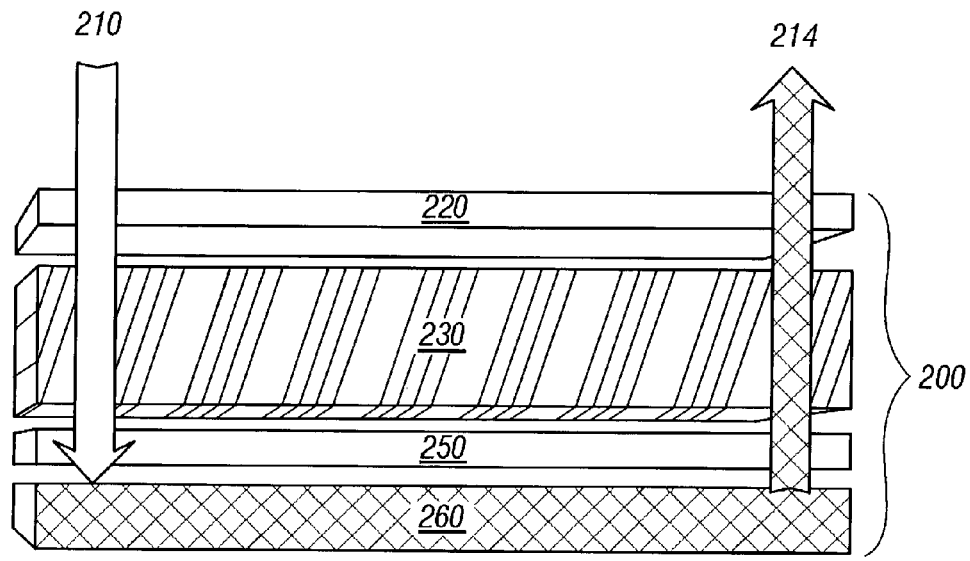
FIG. 4b is a vertical sectional view illustrating the layers of an LCD arrangement in accordance with an embodiment of the present invention wherein the LCD element is in an "ON" state.

For example, FIGS. 4a and 4b, illustrate one embodiment of a color-changing LCD display arrangement 200 which may be incorporated into the present invention. As shown, the LCD display arrangement 200 comprises an LCD element 230 positioned between an polarized upper dial 220 and an inner dial 260. An additional layer comprising reflective polarizer film 250 is positioned between LCD element 230 and inner dial 260. Reflective polarizer film is discussed in detail by U.S. Pat. No. 5,828,488 issued to Ouderkirk et al. and is incorporated by reference herein. Essentially, the reflective polarizer transmits light having a first polarization orientation and reflects light having a different polarization orientation from the first.

The LCD display arrangement 200, shown in FIGS. 4a and 4b is capable of displaying changeable color segments or backgrounds. This is particularly useful for timepiece backgrounds, particularly watch dial backgrounds.

In application, incident light 210 is directed toward the LCD display arrangement 200. Depending whether the LCD display arrangement 200 is in an "OFF" state wherein a first voltage is applied, as in FIG. 4a, or in an "ON" state wherein a second voltage is applied, as in FIG. 4b, incident light 210 is reflected from the LCD display arrangement 200 as either a first or a second color. Specifically, when in the "OFF" state, incident light 210 is reflected as first color 212. When in the "ON" state, incident light 210 is reflected as second color 214.

As illustrated in FIG. 4a, to arrive at first color 212, incident light 210 is passed through the LCD display arrangement 200 in the "OFF" state. The upper dial 220 of the LCD display arrangement 200 is comprised of a polarizer material that causes the transmission of linearly polarized light of a predetermined first direction of incident light and absorbs linearly polarized light of a direction perpendicular to the linearly polarized light of the first direction. The upper dial 220 effectively allows about 50% of light to pass through onward toward the lower layers of the LCD display arrangement 200. Specifically, the transmitted light passing through the upper dial 220 is directed on toward LCD element 230.

The LCD element 230 comprises a polarized light axis changing element such as a twisted nematic (TN) liquid crystal. In the "OFF" state wherein a first voltage is applied to the LCD element 230, the now polarized incident light passes through the LCD element 230 and is twisted about 90 degrees to the predetermined first direction of the linearly polarized light.

The now twisted polarized light is then passed onward to a reflective polarizer film 250. Thus, light 210 passed through the LCD element 230 in the "OFF" state will be reflected off of the surface of film 250 as the orientation of the light is off from that of the reflective polarizer film 250. The reflected light is then passed back through to the surface of the LCD display arrangement 200 as merely white light 212. Although white light 212 is not colored, it will appear as a mirrored background (i.e., silver) due to reflective polarizer film 250.

Referring now to FIG. 4b, with the LCD element 230 in the "ON" state wherein a second voltage is applied to the LCD element 230, the polarized light passing through the LCD element 230 will not be twisted as had occurred in the "OFF" state. As the LCD segments are turned on (i.e., a second voltage applied), they will then become parallel to the transmittance of the polarized light and will not rotate the light. Therefore, when the polarized light reaches reflective polarizer film 250, the orientation of the light will match the polarization of film 250 since the light has not been rotated and will pass through film 250 on to the inner dial 260. The inner dial 260, which is disposed beneath film 250 in the LCD display arrangement 200, may be a patterned and/or colored surface such as a watch dial. The light passing through to the inner dial 260 strikes the surface of the inner dial 260. The light is then reflected back through the layers above to become colored light 214. The appearance and color of light 214 will be as the surface of the inner dial 260 to an observer above the LCD display arrangement 200. The color of the inner dial 260 can comprise any color in the visual spectrum. Alternatively, the inner dial 260 can have a textured design or logo imprinted thereon either alone or with a selected color.

Figures 5A, 5B:
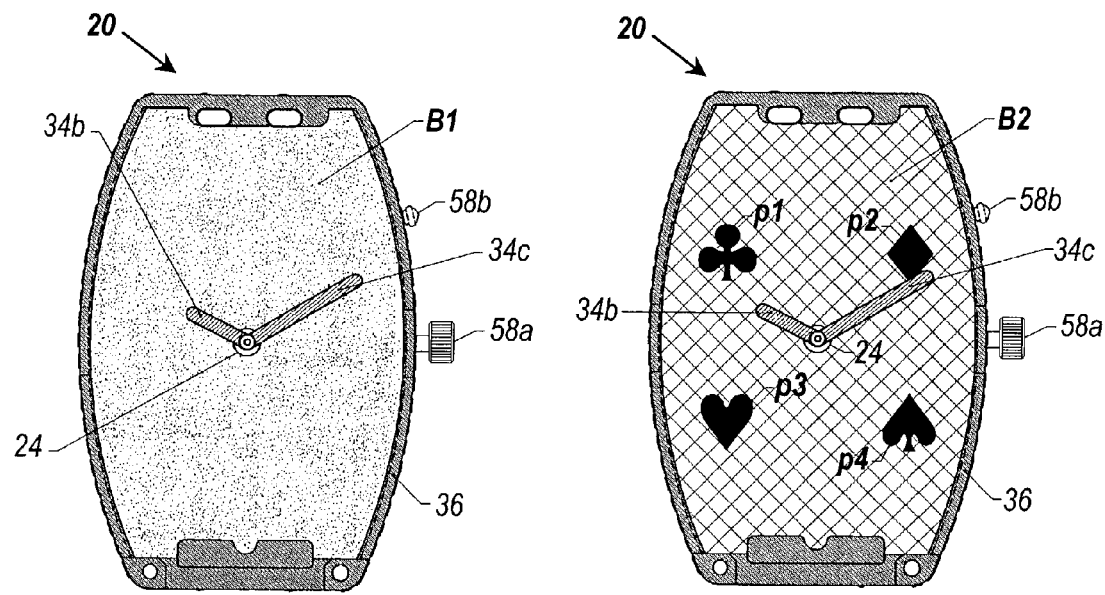
FIG. 5a is a plan view of the watch face display of one embodiment of the present invention, showing the analog display superimposed over the color-changing LCD display, showing a first background as it would appear to a viewer.
FIG. 5b is a plan view of the watch face display of one embodiment of the present invention, showing the analog display superimposed over the color-changing LCD display, showing a second background as it would appear to a viewer.

FIGS. 5a and 5b show plan views of the watch face display of one embodiment of the watch module 20 of the present invention as it would appear to a user. The watch module displays feature an analog time display characterized by the relative position of analog hands 34b, 34c superimposed over a color-changing LCD display with alternating backgrounds B1, B2. To adjust the position of hands 34b, 34c, a conventional stem and crown assembly 58a may be provided for example. To selectively control which background B1, B2 is displayed, a control actuator 58b may also be provided for example. A hole 24 in the LCD display defined by apertures 24c, 24b, 24a in the center of inner dial 32, LCD element 26 and upper dial 22, respectively, allows the hand movement assembly 34a to extend through the LCD display and affix to analog watch hands 34b, 34c. Thereby, watch hands 34b, 34c can be moved in the conventional manner to display an analog indication of time.

As shown in FIG. 5a, the watch face has a first background B1. In this example, this is achieved using the LCD display arrangement 200 in FIG. 4a. The LCD element 230 in watch module 20 is in the "OFF" state. Thus, the first background B1 will appear as a mirrored background (i.e., silver) due to the incident light reflected off of the reflective polarizer film 250.

With FIG. 5b, the watch face has a second background B2. In this example, this is achieved using the LCD display arrangement 200 in FIG. 4b. As such, the LCD element 230 in watch module 20 is in the "ON" state. Thus, the second background B2 will appear as the color of the inner dial 260 because the incident light will be pass through the reflective polarizer film 250 and be reflected from the surface of the inner dial 260.

Although a watch is described here as an example for utilizing a background with selective color, other embodiments utilizing these arrangements are possible. For example, the LCD element 230 of the LCD display may comprise an Electronically Controlled Birefringence (ECB) LCD instead of the conventional LCD. ECB LCDs makes use of an electric field to manipulate the birefingence of the liquid crystal. By altering the orientation of the liquid crystal with an electric field comprised of intermediate voltages, the ECB LCD can control the color of the reflected light. Varying an applied voltage causes the LCD to exhibit different colors on the display. A typical ECB LCD with neutral polarizers may be used to produce colors ranging from pink to green to dark blues. Different colored polarizers, colored reflectors, and retardation film layers may also be utilized to produce ECB LCDs that are capable of generating different color variation. Thus, ECB LCDs are capable of providing an entire gamut of colors within the visible spectrum. This permits the generation of a plurality of color choices for the background, rather than the simple choice between one or two colors. The electronics may also be modified to automatically or at user's selection produce a selected color at the intermediate voltages or produce a smooth gradation change between these different colors. While the arrangements described above for backgrounds with selective color are particularly useful and desirous for watches, other applications are possible. For example, additional displays for watches are possible wherein the LCD element 230 is segmented so as to display a plurality of distinct colored segments or shapes p1–p4. Moreover, utilizing an ECB LCD and additional layers, a particular LCD display can be arranged so as to produce a different color in each segment of the watch face.

To control and facilitate the LCD displays of the above embodiments, known electronics are understood to be incorporated as needed with the invention. This facilitates the color changes of the background and the controlling and driving electronics needed for the watch. These electronics can allow the color to change a predetermined pattern or frequency, such as switching from one color to another every two seconds, or giving the user the ability to select and statically display one of the colors.

A pattern selection functionality provided by the MCU 60 controls the selection of a pattern of segments to which voltage is applied. The pattern selection functionality may be programmed to select voltage patterns in a preprogrammed electronically controlled manner (e.g., in one embodiment a pattern selection means may simply comprise an electronic clocking mechanism used in conjunction with the switching means to create a digital time display) or manually actuated using a control actuator similar to the actuator 58b shown in FIGS. 5a and 5b.

One skilled in the art will recognize that although the embodiment of the watch module 20 of the present invention described in this disclosure depicts a truncated oval design for the housing and LCD display, the present invention may be practiced in timepieces with other physical shapes (such as circular, square, rectangular, etc.) without departing from the present invention.

It will now be evident to those skilled in the art that there has been described herein an improved dual display watch that through a novel configuration of the internal components of the timepiece results in a significant reduction in the thickness of the subject timepiece, thereby enhancing the ergonomic comfort of the individual wearing the timepiece.

Although the invention hereof has been described by way of a preferred embodiment, it will be evident that other adaptations and modifications can be employed without departing from the spirit and scope thereof. It is understood that other modifications, changes and substitutions are intended in the foregoing disclosure and in some instances some features of the invention will be employed without a corresponding use of other features. The terms and expressions employed herein have been used as terms of description and not of limitation; and thus, there is no intent of excluding equivalents, but on the contrary it is intended to cover any and all equivalents that may be employed without departing from the spirit and scope of the invention. Accordingly, it is appropriate that the appended claims be construed broadly and in a manner consistent with the scope of the invention.

What is claimed is:

1. A dual-display watch module that displays the time of day using an analog display superimposed over a color-changing watch face, comprising:
   a color-changing LCD display having a center aperture formed therethrough;
   an analog watch movement positioned beneath said LCD display comprising a hand-moving assembly, and a stem and crown assembly, said hand-moving assembly extends from the analog watch movement through the center aperture in the LCD display;
   an analog display comprising an hour hand and a minute hand, said analog display positioned above the LCD display and coupled to the hand-moving assembly; and
   a driver assembly comprising a PCB assembly and a first and second battery, said driver assembly positioned beneath the LCD display and aligned in a common spatial plane with the analog watch movement, said PCB assembly comprising a micro-control unit (MCU), a timing circuit, an electronic timing standard, and electronic circuitry, wherein said driver assembly couples to and provides signals that drive the LCD display and the analog watch movement.

2. The dual-display watch module of claim 1, wherein the MCU controls the voltage from said batteries to supply a first voltage to power the analog watch movement and a second voltage to power the analog watch movement and the LCD display.

3. The dual-display watch module of claim 2, wherein the driver assembly further comprises a voltage switching means that selectively directs the MCU to supply said second voltage to intermittently power the LCD display.

4. The dual-display watch module of claim 3, wherein the voltage switching means is electronically actuated.

5. The dual-display watch module of claim 3, wherein the voltage switching means is manually actuated.

6. The dual-display watch module of claim 5, further comprising a control actuator for manually actuating said voltage switching means to supply said second voltage to power the LCD display.

7. The dual-display watch module of claim 1, wherein the first and second batteries are 1.5V silver oxide batteries.

8. The dual-display watch module of claim 1, wherein said watch module is disposed within a protective watch case.

9. The dual-display watch module of claim 1, wherein said protective watch case further comprises a transparent crystal coupled to said watch case and an interior bezel with a plurality of markings thereon.

10. The dual-display watch module of claim 1, wherein said watch face is a truncated oval.

11. The dual-display watch module of claim 1, wherein said watch face is circular.

12. The dual-display watch module of claim 1, wherein said watch face is square.

13. The dual-display watch module of claim 1, wherein said watch face is octagonal.

14. A method of making a dual-display watch module that displays the time of day using an analog display superimposed over a color-changing watch face, comprising:
   providing a color-changing LCD display having a center aperture formed therethrough;
   positioning an analog watch movement beneath said LCD display, said movement comprising a hand-moving assembly, and a stem and crown assembly, wherein said hand-moving assembly extends from the analog watch movement through the center aperture in the LCD display;
   affixing an analog display comprising an hour hand and a minute hand to the hand-moving assembly so as to position said analog display above the LCD display;
   positioning a driver assembly, comprised of a PCB assembly and a first and second battery, beneath the LCD display and aligned in a common spatial plane with the analog watch movement, wherein said PCB assembly includes a micro-control unit (MCU), a timing circuit, an electronic timing standard, and electronic circuitry, and wherein said driver assembly couples to and provides signals that drive the LCD display and the analog watch movement.

15. The method of making a dual-display watch module of claim 14, wherein said MCU controls the voltage from said batteries to supply a first voltage to power the analog watch movement and a second voltage to power the analog watch movement and the LCD display.

16. The method of making a dual-display watch module of claim 15, wherein the driver assembly further comprises a voltage switching means that selectively directs the MCU to supply said second voltage to power the LCD display.

17. The method of making a dual-display watch module of claim 16, wherein the voltage switching means is electronically actuated.

18. The method of making a dual-display watch module of claim 16, wherein the voltage switching means is manually actuated.

19. The method of making a dual-display watch module of claim 18, further comprising providing a control actuator to manually actuate said voltage switching means to supply said second voltage to power the LCD display.

20. The method of making a dual-display watch module of claim 14, wherein the first and second batteries are 1.5V silver oxide batteries.

21. The method of making a dual-display watch module of claim 14, further comprising inserting said watch module into a protective watch case.

22. The method of making a dual-display watch module of claim 14, wherein said protective watch case further comprises a transparent crystal coupled to said watch case and an interior bezel with a plurality of markings thereon.

23. The method of making a dual-display watch module of claim 14, wherein said watch face is a truncated oval.

24. The method of making a dual-display watch module of claim 14, wherein said watch face is circular.

25. The method of making a dual-display watch module of claim 14, wherein said watch face is square.

26. The method of making a dual-display watch module of claim 14, wherein said watch face is octagonal.

* * * * *